(12) United States Patent
Wu

(10) Patent No.: US 9,013,404 B2
(45) Date of Patent: Apr. 21, 2015

(54) METHOD AND LOCATING DEVICE FOR LOCATING A POINTING DEVICE

(71) Applicant: Unigrand Ltd., New Taipei (TW)

(72) Inventor: Chien-Wei Wu, New Taipei (TW)

(73) Assignee: Unigrand Ltd., New Taipei (TW)

( * ) Notice: Subject to any disclaimer, the term of this patent is extended or adjusted under 35 U.S.C. 154(b) by 0 days.

(21) Appl. No.: 14/106,727

(22) Filed: Dec. 14, 2013

(65) Prior Publication Data

US 2014/0327617 A1 Nov. 6, 2014

(30) Foreign Application Priority Data

May 1, 2013 (TW) .............................. 102115588 A

(51) Int. Cl.
G06F 3/033 (2013.01)
G06F 3/0346 (2013.01)
G06F 3/0338 (2013.01)
G06F 3/038 (2013.01)
G06F 3/03 (2006.01)

(52) U.S. Cl.
CPC ............ G06F 3/0346 (2013.01); G06F 3/0338 (2013.01); G06F 3/038 (2013.01); G06F 3/0325 (2013.01)

(58) Field of Classification Search
None
See application file for complete search history.

(56) References Cited

U.S. PATENT DOCUMENTS

| | | | |
|---|---|---|---|
| 8,308,563 B2 * | 11/2012 | Ikeda et al. ...................... | 463/37 |
| 8,467,133 B2 * | 6/2013 | Miller ............................ | 359/630 |
| 2008/0278445 A1 * | 11/2008 | Sweetser et al. ............... | 345/158 |
| 2014/0270351 A1 * | 9/2014 | Hoof et al. ..................... | 382/103 |

* cited by examiner

Primary Examiner — Muhammad N Edun
(74) Attorney, Agent, or Firm — The Mueller Law Office, P.C.

(57) ABSTRACT

A locating device is for locating a pointing device. The pointing device is configured to capture a plurality of images, to measure an angular rate of the pointing device, and to generate and output current coordinate data associated with an orientation of the pointing device when at least one of the images contains infrared light from a light source module. The locating device is configured to receive the current coordinate data and the angular rate from the pointing device, to generate a cursor signal based on one of the current coordinate data and the angular rate, and to transmit the cursor signal to a computing device, which is configured to move a cursor on a display unit, according to the cursor signal.

8 Claims, 4 Drawing Sheets

METHOD AND LOCATING DEVICE FOR LOCATING A POINTING DEVICE

CROSS-REFERENCE TO RELATED APPLICATION

This application claims priority of Taiwanese Application No. 102115588, filed on May 1, 2013.

BACKGROUND OF THE INVENTION

1. Field of the Invention

The invention relates to a locating device, more particularly to a locating device and a method configured to locate a pointing device operated in a three-dimensional space.

2. Description of the Related Art

A conventional pointing device (e.g., a mouse) is designed to operate on a two-dimensional surface. Recently, a three-dimensional (3D) pointing device has been developed. A 3D mouse, for example, is for controlling a cursor displayed on a screen, where a movement of the cursor is controlled by the movement of the 3D mouse within a space. The 3D mouse includes a gyroscope and an accelerator, and is capable of continuously detecting a self-motion (e.g., orientation and/or direction of the movement). A control signal is then derived by accumulating the detected self-motion, and is used for controlling the movement of the cursor. One disadvantage of such a configuration is that the accuracy is limited, and a difference between the movement of the 3D mouse and the movement of the cursor may increase with time. For example, consider a user who starts using the 3D mouse at an origin point (e.g., one that corresponds to a central point on the display unit). After a series of movement/orientations, when he/she returns the 3D mouse back to the origin point, the cursor may not be returned to the central point as desired.

One example of a 3D pointing device that may overcome the abovementioned drawback is the Wii remote (disclosed in, for example, U.S. Pat. No. 8,308,563) for the Wii console. The Wii remote includes an image pickup section, and is to be used with an optical sensor bar including a pair of spaced-apart Infrared (IR) light sources. The optical sensor bar is disposed near a display unit (e.g., a television screen) coupled to the console. When a user directs the Wii remote toward the display unit, the console is configured to control the display unit to display a cursor thereon.

The image pickup section is configured to capture a plurality of images. When one of the images contains IR light from the two IR light sources, an image processing circuit is operable to identify two bright spots in the one of the images that has higher brightness (i.e., corresponding respectively to the IR light sources), and to generate a cursor signal containing coordinate data associated with the bright spots in the one of the images. The cursor signal is then transmitted back to the console, which in turn controls the location of the cursor on the display unit based on the cursor signal.

The Wii remote may achieve higher accuracy given that the IR light sources, which serve as reference points, are fixed at same locations during operation. In such cases, whenever the Wii remote is at a certain point, the images generated by the image pickup section always have the bright spots fixed at same locations, regardless of the movements/orientations involved.

However, the Wii remote is limited to move within a certain space where light from both the IR light sources can be detected by the image pickup section. For example, when the Wii remote is swayed out of such certain space, the cursor is then rendered uncontrollable. Additionally, the image pickup section is only able to capture images with a relatively low resolution (e.g., a 480 p resolution). When it is desired to use the Wii remote on a screen supporting a higher resolution (e.g., 1080 p), the sensitivity of the cursor movement is somewhat capped.

SUMMARY OF THE INVENTION

Therefore, the object of the present invention is to provide a locating device that is for use with a conventional 3D pointing device and that is able to alleviate at least one of the drawbacks described above.

Accordingly, a locating device of the present invention is configured to operatively communicate with a pointing device and a computing device for locating the pointing device. The pointing device includes an image pickup section for capturing a plurality of images, and a gyroscope for measuring an angular rate of the pointing device. The pointing device is operable to generate and output current coordinate data associated with an orientation of the pointing device when at least one of the images contains infrared light from a light source module. The computing device is configured to display a cursor on a display unit. The locating device comprises a wireless communication module and a data processor.

The wireless communication module is configured to receive the current coordinate data and the angular rate from the pointing device.

The data processor is coupled to the wireless communication module, and is configured to: generate a cursor signal based on one of the current coordinate data and the angular rate; and transmit the cursor signal to the computing device so as to enable the computing device to move the cursor according to the cursor signal.

The data processor is configured to generate the cursor signal based on the current coordinate data when the current coordinate data is received, and based on the angular rate when the current coordinate data is not received.

Another object of the present invention is to provide a method to be implemented by the locating device for locating the pointing device.

Accordingly, a method of the present invention is to be implemented using a locating device and a computing device for locating the pointing device. The pointing device includes an image pickup section for capturing a plurality of images, and a gyroscope for measuring an angular rate of the pointing device. The pointing device is operable to generate and output current coordinate data associated with an orientation of the pointing device when at least one of the images contains infrared light from a light source module. The computing device is configured to display a cursor on a display unit. The method comprises:

(A) receiving, by a wireless communication module of the locating device, the current coordinate data and the angular rate from the pointing device;

(B) generating, by a data processor of the locating device, a cursor signal based on one of the current coordinate data and the angular rate; and (C) transmitting, by the data processor, the cursor signal to the computing device so as to enable the computing device to move the cursor according to the cursor signal.

In step (B), the data processor is configured to generate the cursor signal based on the current coordinate data when the current coordinate data is received, and based on the angular rate when the current coordinate data is not received.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
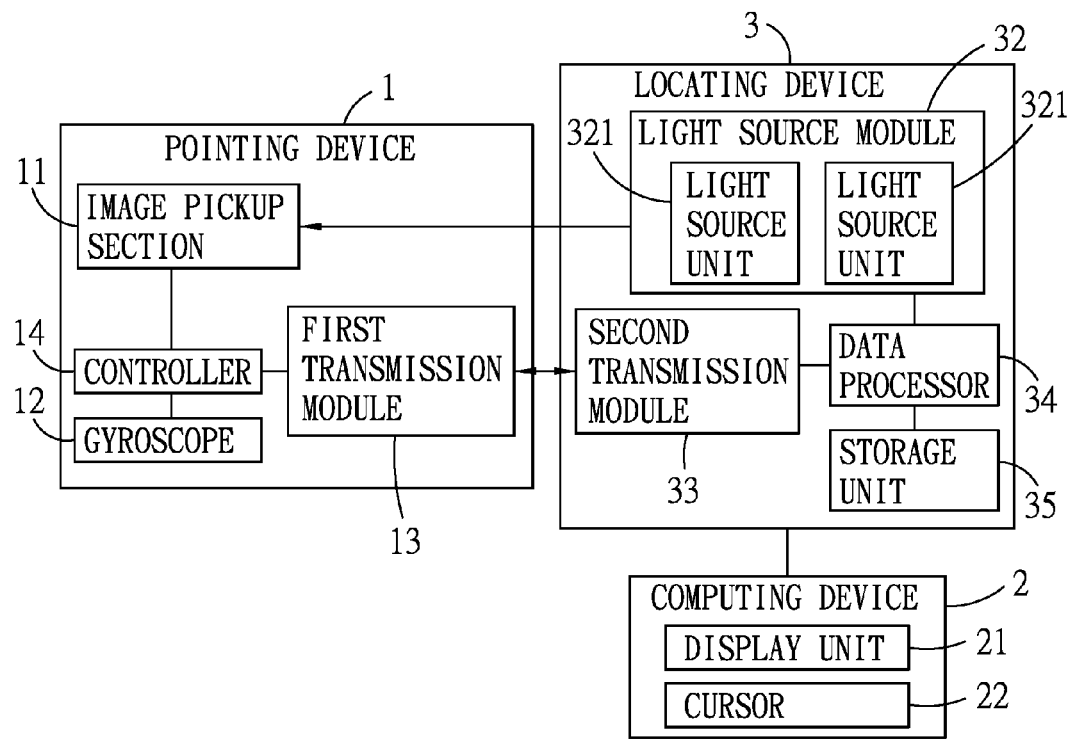
FIG. 1 is a schematic block diagram of a preferred embodiment of a locating device operatively communicating with a pointing device and a computing device, according to the invention.

As shown in FIG. 1, according to the preferred embodiment of this invention, a locating device 3 is configured to operatively communicate with a pointing device 1 and a computing device 2, in order to locate the pointing device 1.

The pointing device 1 includes an image pickup section 11, a gyroscope 12, a first transmission module 13, and a controller 14 coupled to the image pickup section 11, the gyroscope 12, and the first transmission module 13.

In this embodiment, the pointing device 1 is embodied as a Wii remote controller available from Nintendo Co., Ltd. with an expansion device (e.g., Wii MotionPlus available from Nintendo Co., Ltd) attached thereto. The gyroscope 12 is incorporated in the Wii MotionPlus so as to allow more accurate movement detection.

The computing device 2 is embodied as an electronic device such as a television provided with a Wii console, a personal computer (PC), a laptop computer, etc., and includes a display unit 21. The computing device 2 is configured to display a cursor 22 (e.g., a mouse cursor) on the display unit 21.

The locating device 3 is able to control the computing device 2 to move the cursor 22 based on data received from the pointing device 1, so as to allow a user of the pointing device 1 to interact with the computing device 2 by controlling (e.g., moving and/or clicking) the cursor 22 using the pointing device 1. In this embodiment, the locating device 3 is embodied as a sensor bar used in the Wii system, and may be disposed above or below the display unit 21 in operation.

Figure 2:
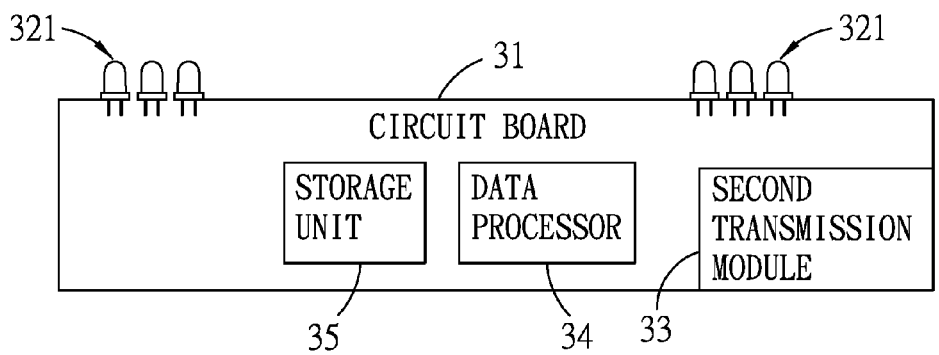
FIG. 2 illustrates a block diagram of the locating device according to the preferred embodiment.

As shown in FIG. 2, the locating device 3 includes a housing (not depicted in the drawings), and a plurality of components contained in the housing that include, but are not limited to, a circuit board 31, a light source module 32 disposed on the circuit board 31, a second transmission module 33, a data processor 34, and a storage unit 35.

In this embodiment, the light source module 32 includes a pair of spaced-apart light source units 321, each of which has three infrared (IR) light-emitting diodes (LEDs) configured to emit infrared (IR) light. However, in other embodiments, different numbers of light source units 321 (e.g., one) and/or different number of the IR LEDs in each of the light source units 321 may be employed, as long as IR light from the light source units 321 can be detected by the image pickup section 11 within an operation distance.

The operation of the pointing device 1, along with the interactions among the locating device 3, the pointing device 1 and the computing device 2, will now be described with reference to FIGS. 3A and 3B.

Figure 3A:
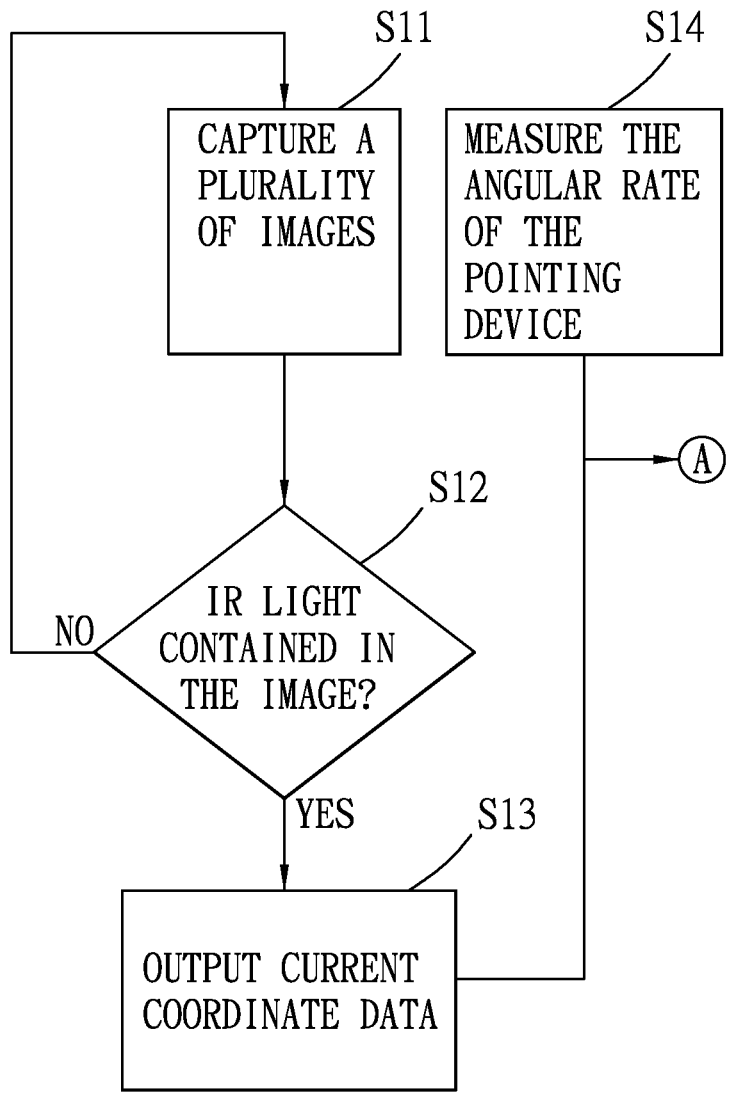
FIGS. 3A and 3B are flow charts illustrating steps of a method implemented by the locating device for locating the pointing device, according to the preferred embodiment.

Referring to FIG. 3A, in step S11, the image pickup section 11 is operable to capture a plurality of images successively. In step S12, the image pickup section 11 determines whether each of the images captured in step S11 includes IR light. When it is determined that one of the images contains IR light, the image pickup section 11 is operable to generate and output current coordinate data associated with an orientation of the pointing device 1 in step S13.

For example, in this embodiment, the image pickup section 11 includes an IR filter for allowing only IR light to pass therethrough, an image pickup element for capturing the images, and a calculation unit for processing the images captured by the image pickup element.

After the images are captured, the calculation unit spots the IR light on the images, and outputs a set of coordinates for each of the images containing the IR light as the current coordinate data.

In the case where the IR light is spotted on more than one location on the image, the set of coordinates may indicate a geometric center of the IR lights in the image. In cases where the IR light is spotted on exactly one location of the image, the set of coordinates may indicate the one location of the image.

In other embodiments where different numbers of light source units 321 are employed, other calculating algorithms may be used for outputting the current coordinate data that appropriately represents the location of the pointing device 1 relative to the light source module 32.

Using this configuration, when the pointing device 1 is moved relative to the light source module 32, the image pickup section 11 may direct to a different direction (e.g., upward, downward, left, right, etc.), resulting in an immediately captured image with the IR light spotted in a different location thereof. This in turn causes the calculation unit to output a set of coordinates different from the previous one.

In step S14, the gyroscope 12 is configured to measure the angular rate of the pointing device 1 continuously.

Figure 3B:
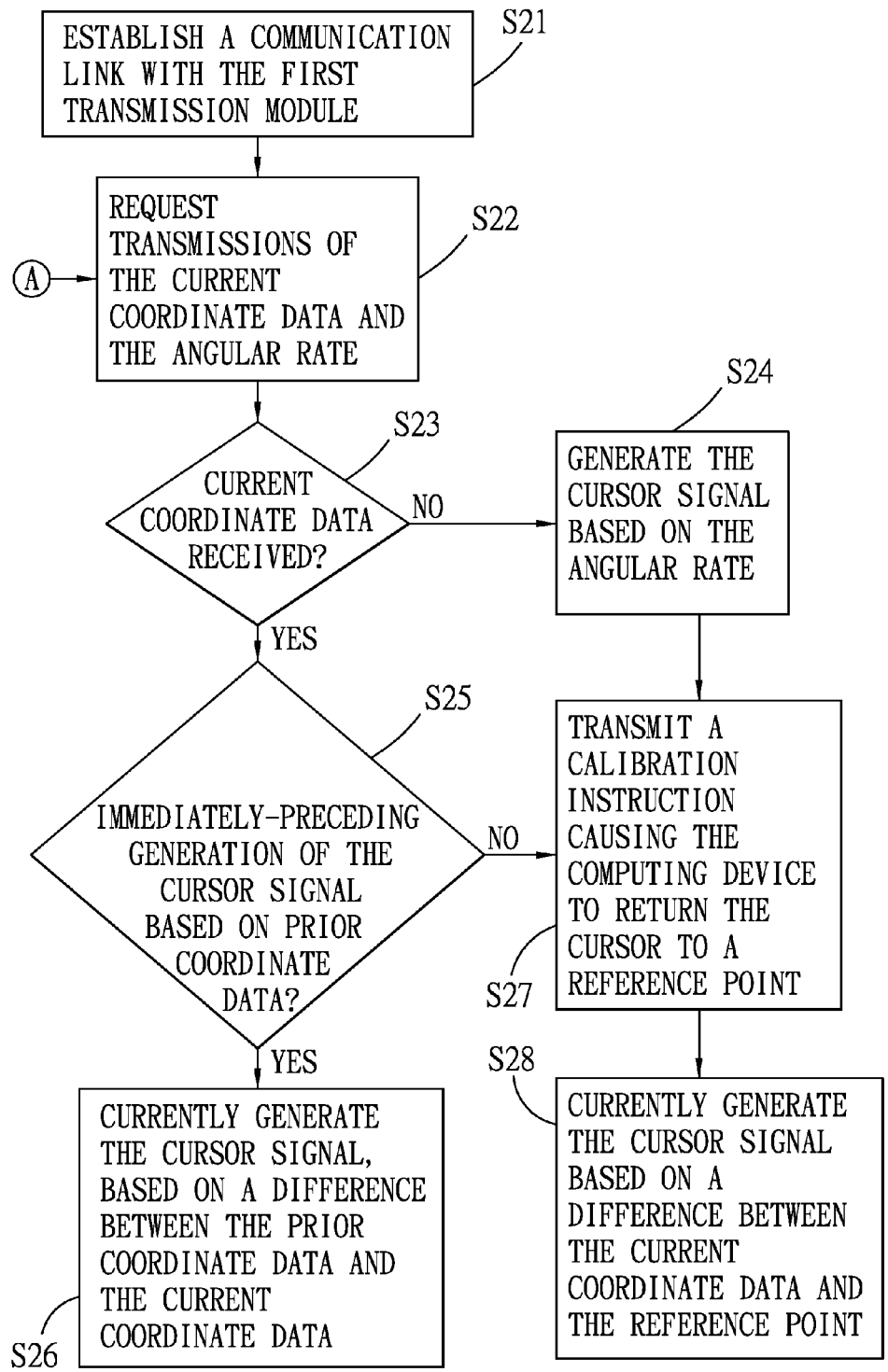

Referring to FIG. 3B, in step S21, the second transmission module 33 establishes a communication link with the first transmission module 13. In this embodiment, the first transmission module 13 and the second transmission module 33 may exchange data using the Bluetooth standard.

In step S22, the second transmission module 33 requests the current coordinate data and the angular rate from the pointing device 1. Upon receipt of the request, the controller 14 transmits related data to the second transmission module 33 via the first transmission module 13. The data received by the second transmission module 33 may then be stored in the storage unit 35 for subsequent processing.

The data processor 34 is operable to load an application program in the storage unit 35 for processing the data received by the second transmission module 33. After processing the data, the data processor 34 generates a cursor signal and transmits the same to the computing device 2. The cursor signal is associated with the movement of the pointing device 1 (i.e., how the cursor 22 should be moved accordingly), and the computing device 2 controls movement of the cursor on the display unit 21 according to the cursor signal.

It should be noted that the current coordinate data may not always be available. For example, when the images captured by the image pickup section 11 do not contain the IR light from the light source module 32 (e.g., the light source module 32 being temporarily blocked and/or the pointing device 1 moving out of range), the current coordinate data cannot be outputted. On the other hand, the angular rate of the pointing device 1 is available at all times.

In this embodiment, in step S23, the data processor 34 first determines whether the current coordinate data is received by the second transmission module 33. When it is determined that no current coordinate data is received, the flow proceeds to step S24, in which the data processor 34 generates the cursor signal based on the angular rate and outputs the same to the computing device 2.

On the other hand, when it is determined that the current coordinate data is received, the flow proceeds to step S25.

Specifically, in step S25, the data processor 34 determines whether an immediately-preceding generation of the cursor signal was based on prior coordinate data associated with the pointing device 1.

When such a determination is affirmative, the flow proceeds to step S26, where the data processor 34 currently generates the cursor signal based on a difference between the prior coordinate data and the current coordinate data.

When the determination made in step S25 is not affirmative, the flow proceeds to step S27. It is noted that in the cases where the locating device 3 is just activated to receive data (i.e., no immediately-preceding generation of the cursor signal exists), the flow also proceeds to step S27.

In step S27, the data processor 34 transmits a calibration instruction to cause the computing device 2 to calibrate the cursor 22 with a reference point (e.g., a "zero point" having a set of coordinates (0, 0) is assigned) on the display unit 21. Afterward, in step S28, the data processor 34 currently generates and transmits the cursor signal to the computing device 2. The currently generated cursor signal is based on a difference between the current coordinate data and the reference point.

It is noted that a driver used by the computing device 2 for coordinating the pointing device 1 and the cursor 22 only employs the difference between the current and prior coordinate data (i.e., a "relative displacement") for controlling movement of the cursor 22, while other peripherals, such as a graphics tablet, further employs the difference between the current coordinate data and the fixed reference point (i.e., an "absolute displacement") for controlling movement of the cursor 22.

In this embodiment, as long as the IR light from the light source module 32 is detected by the image pickup section 11, the flow ends up performing step S26 for generating the cursor signal. However, in the case where the image pickup section 11 does not detect the IR light from the light source module 32 (e.g., the light source module 32 being blocked), the flow first proceeds to step S24 for controlling the cursor 22 using the angular rate of the pointing device 1, and then, when the image pickup section 11 detects the IR light from the light source module 32, proceeds to steps S27 and S28 for calibration before proceeding to step S26 the next time. In the case that no immediately-preceding generation of the cursor signal exists, the flow first proceeds to steps S27 and S28 for calibration before proceeding to step S26.

Figure 4:
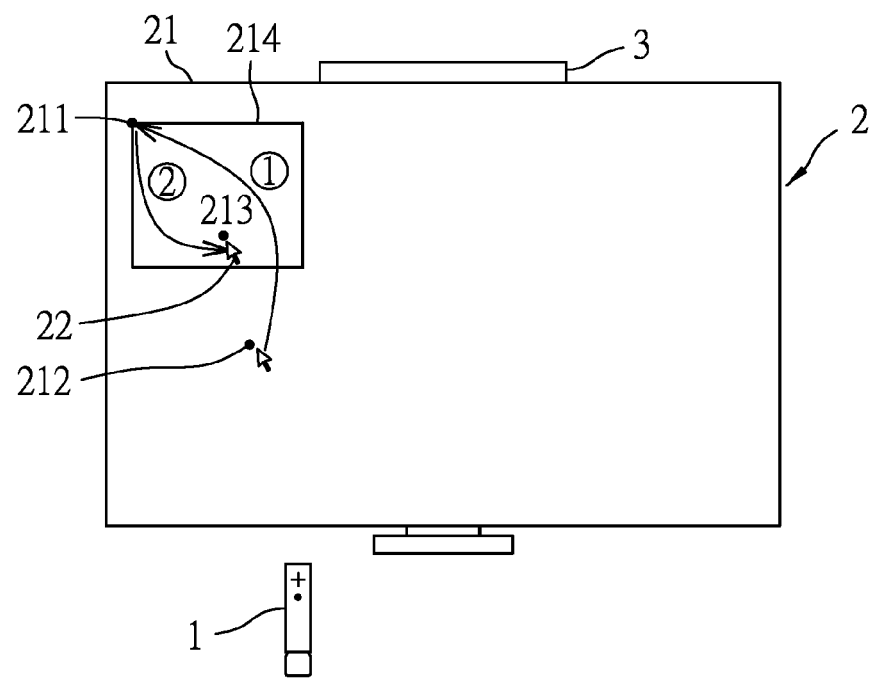
FIG. 4 illustrates a cursor being calibrated before being moved to an intended point, according to an example.

Referring to FIG. 4, in an exemplary operation of steps S27 and S28, a reference point 211 is located on an upper left corner of the display unit 21. Assume that the cursor 22 is first located on the point 212, and a user picks up the pointing device 1 that was dropped on the floor, and intends to move the cursor 22 to the point 213. The operation starts at step S27, in which the data processor 34 transmits the calibration instruction. In the example of FIG. 4, the calibration instruction causes the cursor 22 to move a large distance (i.e., a distance much longer than the width of the display unit 21) along a horizontal axis to the left, and a large distance (i.e., a distance much longer than the height of the display unit 21) upwardly along a vertical axis. Such a calibration instruction causes the cursor 22 to move to the upper-left corner. Afterward, in step S28, the cursor signal moves the cursor 22 to the intended point 213.

Figure 5:
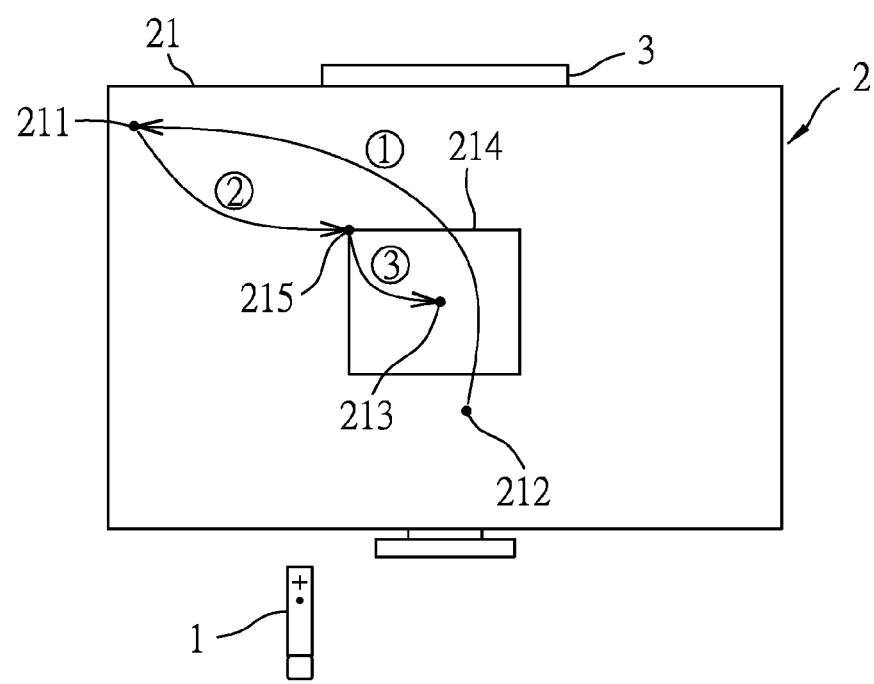
FIG. 5 illustrates another example similar to that depicted in FIG. 4.

It is noted that, in other examples, the reference point may be located at an arbitrary location of the display unit 21. Referring to FIG. 5, in another exemplary operation of steps S27 and S28, the reference point is located at the point 215 of the display unit 21. In this example, in step S27, the calibration instruction causes the cursor 22 to first move to the point 211 (in a manner similar to that as described with reference to FIG. 4) and then move to the point 215.

Referring to FIGS. 1, 4 and 5, it is noted that, when the cursor signal is generated based on the current coordinate data, the movement of the cursor is restricted to be within a region 214 of the display unit 21 (shown in dotted lines in FIGS. 4 and 5), having a resolution conforming with that of the images captured by the image pickup section 11. In other words, each pixel on the images corresponds to a pixel constituting the region 214. Since the images have a resolution smaller than that of the display unit 21, it is known that the region 214 only takes up a part of the display unit 21. Limiting the region 214 in which the cursor is allowed to move may increase the accuracy and sensitivity of the movement of the cursor 22. Regardless of the movements between an initial time point and an end time point, as long as the pointing device 1 does not have a net displacement (i.e., at the end time point, the pointing device 1 is returned to the position of the initial time point), the cursor 22 will accurately return to a position of the initial time point as well.

For example, when the pointing device 1 is first at a first state (e.g., at a starting point and pointing directly at the display 21), the cursor 22 is at point 213 of the display unit 21. Next, the pointing device 1 experiences a series of movements (which may include, for example, a 10-cm movement to the right and a 30-degree clockwise rotation with respect to the first state), and changes to a second state. In this example, regardless of the series of the movement in the second state, when the pointing device 1 is returned to the first state, the cursor accordingly returns to the point 213.

It can be seen that, using the current coordinate data for locating the pointing device 1 can achieve a higher accuracy than using the angular rate. Therefore, in the embodiments, whenever the current coordinate data is received, the data processor 34 may automatically perform a re-calibration for the pointing device 1. This configuration may be advantageous over the conventional 3D mouse that, when a re-calibration is desired, requires the user to press and hold a specific button on the 3D mouse and manually move the 3D mouse to an instructed location before releasing the button.

The operation of step S24 will now be described. In this embodiment, the angular rate obtained by the gyroscope 12 includes a Y-rate of the pointing device 1 around the yaw axis and a P-rate of the pointing device 1 around the pitch axis. Specifically, the Y-rate is used for obtaining an equivalent displacement of the pointing device 1 along the horizontal axis, and the P-rate is used for obtaining an equivalent displacement of the pointing device 1 along the vertical axis. The gyroscope 12 may also obtain an R-rate of the pointing device 1 around the roll axis. Since the procedure for obtaining the equivalent displacement from the angular rate may be readily appreciated by those skilled in the art, details thereof are omitted herein for the sake of brevity.

To sum up, the locating device 3 of the present invention employs not only the current coordinate data, but also the angular rate associated with the pointing device 1 for controlling the computing device 2 to move the cursor 22, such that the cursor 22 can be controlled even though the image pickup section 11 is temporarily unable to detect the IR light from the light source module 32. Embodiments of the present invention also enable automatic re-calibration between the pointing device 1 and the cursor 22 when the current coordinate data is received by the locating device 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A locating device configured to operatively communicate with a pointing device and a computing device for locating the pointing device, the pointing device including an image pickup section for capturing a plurality of images, and a gyroscope for measuring an angular rate of the pointing device, the pointing device being operable to generate and output current coordinate data associated with an orientation of the pointing device when at least one of the images contains infrared light from a light source module, the computing device being configured to display a cursor on a display unit, said locating device comprising:
   a wireless communication module that is configured to receive the current coordinate data and the angular rate from the pointing device; and
   a data processor coupled to said wireless communication module, said data processor being configured to generate a cursor signal based on one of the current coordinate data and the angular rate, and to transmit the cursor signal to the computing device so as to enable the computing device to move the cursor according to the cursor signal;
   wherein said data processor is configured to generate the cursor signal based on the current coordinate data when the current coordinate data is received, and based on the angular rate when the current coordinate data is not received.

2. The locating device of claim 1, wherein, upon receipt of the current coordinate data, said data processor is further configured to:
   determine whether the immediately-preceding generation of the cursor signal was based on prior coordinate data associated with the pointing device; and
   when it is determined that the immediately-preceding generation of the cursor signal was based on the prior coordinate data, currently generate the cursor signal based on a difference between the prior coordinate data and the current coordinate data.

3. The locating device of claim 1, wherein, upon receipt of the current coordinate data, said data processor is further configured to:
   determine whether the immediately-preceding generation of the cursor signal was based on prior coordinate data associated with the pointing device; and
   when it is determined that the immediately-preceding generation of the cursor signal was not based on the prior coordinate data, transmit a calibration instruction to cause the computing device to calibrate the cursor with a reference point on the display unit, and currently generate the cursor signal based on a difference between the current coordinate data and the reference point.

4. The locating device of claim 1, wherein, when the cursor signal is generated based on the current coordinate data, the movement of the cursor is restricted to be within a region of the display unit having a resolution conforming with that of the images captured by the image pickup section.

5. A method to be implemented using a locating device and a computing device for locating the pointing device, the pointing device including an image pickup section for capturing a plurality of images, and a gyroscope for measuring an angular rate of the pointing device, the pointing device being operable to generate and output current coordinate data associated with an orientation of the pointing device when at least one of the images contains infrared light from a light source module, the computing device being configured to display a cursor on a display unit, said method comprising:
   (A) receiving, by a wireless communication module of the locating device, the current coordinate data and the angular rate from the pointing device;
   (B) generating, by a data processor of the locating device, a cursor signal based on one of the current coordinate data and the angular rate; and
   (C) transmitting, by the data processor, the cursor signal to the computing device so as to enable the computing device to move the cursor according to the cursor signal;
   wherein, in step (B), the data processor is configured to generate the cursor signal based on the current coordinate data when the current coordinate data is received, and based on the angular rate when the current coordinate data is not received.

6. The method of claim 5, wherein step (B) includes the following sub-steps of:
   upon receipt of the current coordinate data, determining, by the data processor, whether the immediately-preceding generation of the cursor signal was based on prior coordinate data associated with the pointing device; and
   when it is determined that the immediately-preceding generation of the cursor signal was based on the prior coordinate data, currently generating, by the data processor, the cursor signal based on a difference between the prior coordinate data and the current coordinate data.

7. The method of claim 5, wherein step (B) includes the following sub-steps of:
   upon receipt of the current coordinate data, determining, by the data processor, whether the immediately-preceding generation of the cursor signal was based on prior coordinate data associated with the pointing device; and
   when it is determined that the immediately-preceding generation of the cursor signal was not based on the prior coordinate data, transmit a calibration instruction to cause the computing device to calibrate the cursor with a reference point on the display unit, and currently generating, by the data processor, the cursor signal based on a difference between the current coordinate data and the reference point.

8. The method of claim 5, wherein, when the cursor signal is generated based on the current coordinate data, the movement of the cursor is to be restricted within a region of the display unit having a resolution conforming with that of the images captured by the image pickup section.

* * * * *